United States Patent [19]

Chen

[11] 4,073,604
[45] Feb. 14, 1978

[54] CONSTRUCTION FOR A WATER HAMMER TYPE PUMP

[76] Inventor: Chun-Pa Chen, 10A, Lane 10, Hsin Sheng S. Road, Taipei, China /Taiwan

[21] Appl. No.: 715,904

[22] Filed: Aug. 19, 1976

[51] Int. Cl.² ..................... F04F 7/02; F16K 17/12; F16K 17/06
[52] U.S. Cl. ..................... 417/226; 137/515.7; 137/527; 137/529; 137/541
[58] Field of Search ............... 417/199 R, 225, 226, 417/227; 137/520, 515.7, 527, 527.6, 527.8, 529, 541; 251/338

[56] References Cited

U.S. PATENT DOCUMENTS

| | | | |
|---|---|---|---|
| 4,328 | 12/1845 | Benson | 417/226 |
| 5,725 | 8/1848 | Leighton | 417/226 |
| 525,305 | 8/1894 | Allen et al. | 417/199 |
| 542,417 | 7/1895 | Lenhart | 137/527.8 |
| 936,244 | 10/1909 | Hesse | 417/226 |
| 1,268,597 | 6/1918 | Montreuil | 137/529 |
| 1,619,033 | 3/1927 | Perrenot | 137/527.8 |
| 2,037,023 | 4/1936 | Holby | 137/527.8 |

FOREIGN PATENT DOCUMENTS

| | | | |
|---|---|---|---|
| 257,380 | 6/1896 | France | 417/226 |
| 416,449 | 1909 | France | 417/226 |

*Primary Examiner*—William L. Freeh
*Assistant Examiner*—Richard Gluck
*Attorney, Agent, or Firm*—Haseltine, Lake & Waters

[57] ABSTRACT

A high efficiency water hammer type pump and more particularly, an improved construction for such a pump including a construction whereby water expelled from a waste valve is returned to the supply line of the pump.

7 Claims, 5 Drawing Figures

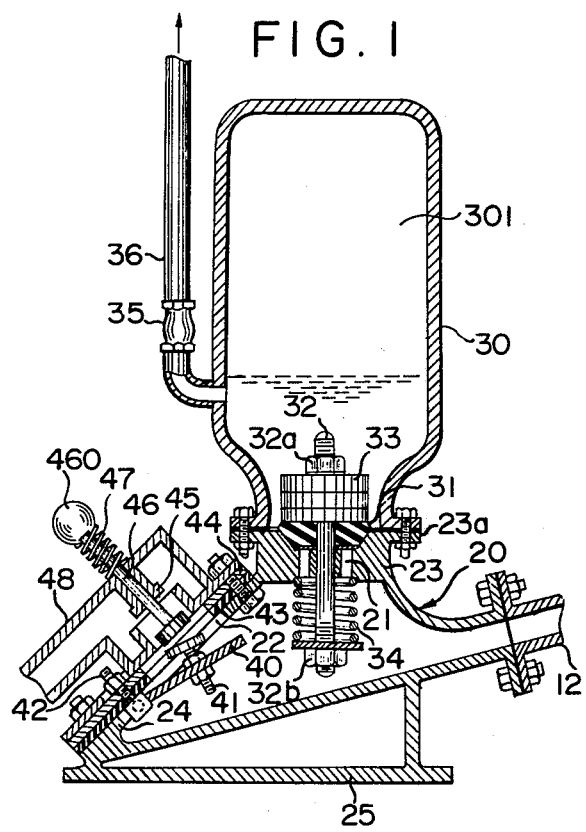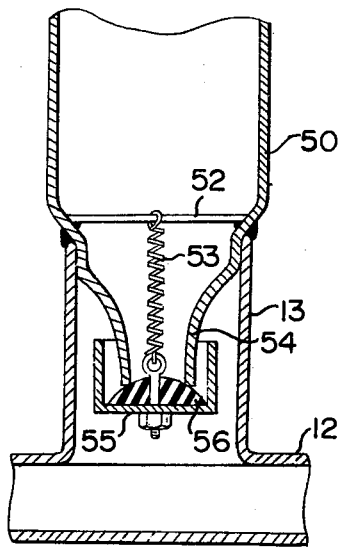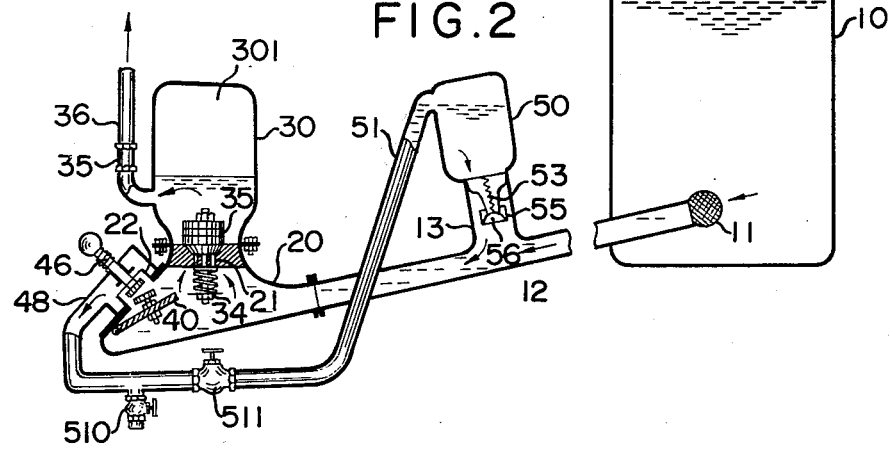

CONSTRUCTION FOR A WATER HAMMER TYPE PUMP

BACKGROUND OF THE INVENTION

Although water hammer type pumps have been known for almost two centuries, they generally have not been developed to the point where they may be made available for general private and commercial use. The two major defects preventing such use are:

1. The highly destructive force of the water-hammer tends to decrease the life of the pump and, over a period of time, damage the two main valves responsible for producing the water hammer. To protect water conduits and valves from this destructive force, relief valves and bursting plates are sometimes used. However, there still remains the problem of noise and vibration caused by the constant opening and closing of the valves, making such a pump undesirable for use in urban and residential areas.

2. To create the water hammer to operate the pump, it is necessary to install a waste valve which shoots the "waste" water out of the pump at every stroke of the water hammer. While this is relatively unimportant for agricultural use when fresh water supplies are abundant, it is impractical to pump precious treated water to supply schools, factories, homes, and offices for human consumption with such a wasteful device.

It may be seen that the enormous savings of energy attained through the use of a pump operated by a water hammer are often offset by the waste, noise and limited life of such pumps.

SUMMARY OF THE INVENTION

It is an object of the present invention to provide a high efficiency pump of smooth and stable operation and of reduced noise and vibration operated solely by water hammer force.

It is a further object of the present invention to provide a high efficiency water hammer type pump wherein the waste valve may remain closed for a maximum period of time to provide a smooth pumping operation able to supply water at a relatively even flow.

According to one embodiment of the present invention a water hammer type pump is provided wherein water released by the waste valve may be returned to the pump without decreasing the efficiency of the pump.

According to a further embodiment of a water hammer type pump according the present invention to a secondary pump is provided which, by utilizing the up and down motion of the discharge valve of the water hammer type pump to drive a piston thereof, is capable of pumping water from underground sources to replenish the supply source of the water hammer pump.

BRIEF DESCRIPTION OF THE DRAWINGS

Numerous other purposes and advantages of a pump according to the present invention will become obvious as the invention is now described with reference to the appended drawings, wherein:

FIG. 1 is a view in cross-section of a water hammer type pump according to the present invention;

FIG. 2 is a diagram of a pump provided with a waste water return device according to the present invention;

FIG. 3 is a more detailed view in cross section of the return tank thereof;

DETAILED DESCRIPTION OF THE INVENTION

Figure 4:
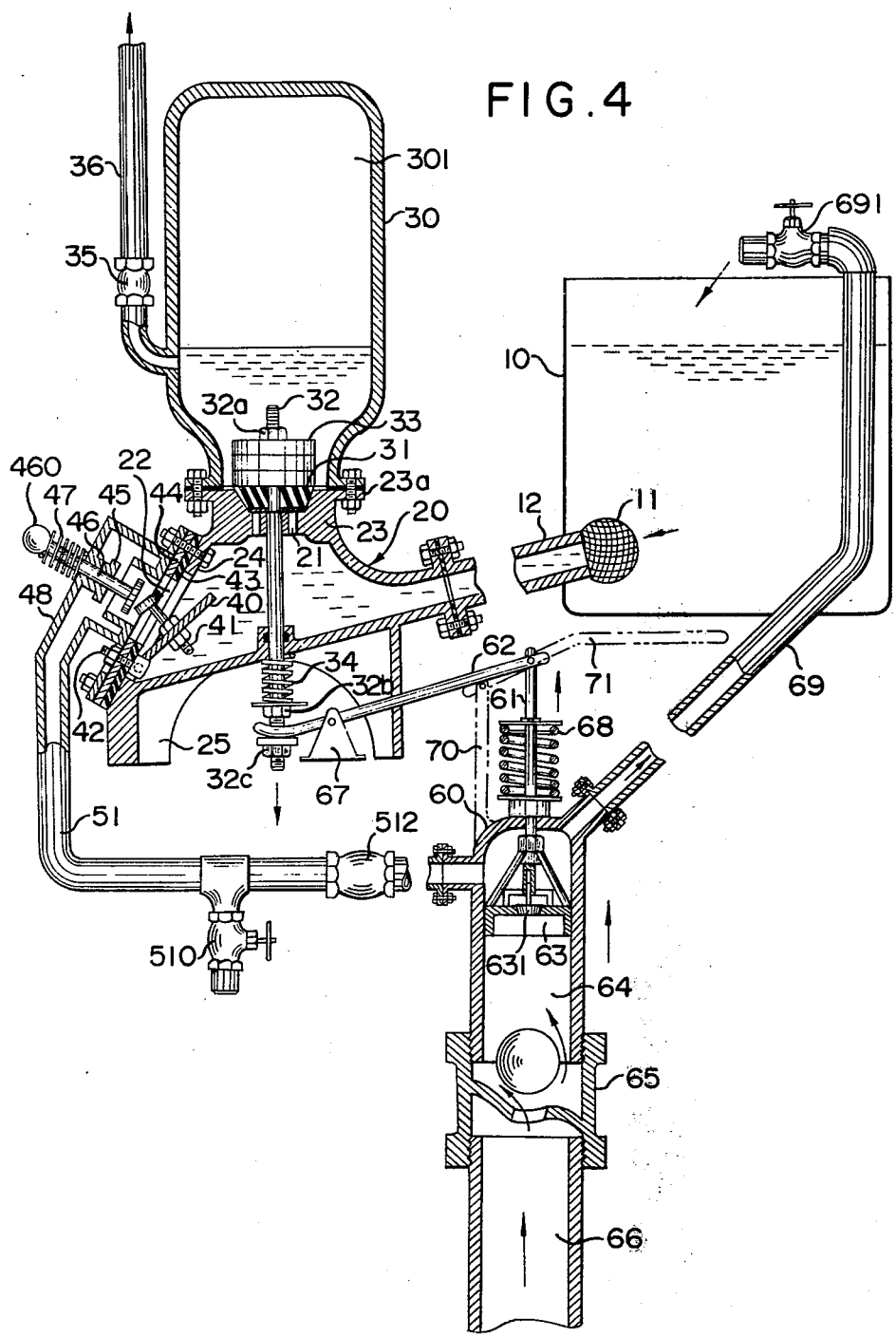
FIG. 4 is a view in cross section of a second embodiment of the present invention.

As shown in FIG. 1, a pump made in accordance with the present invention is comprised of a pump body 20 having fixed at one end a supply pipe 12 for supplying water to said pump body 20 from a supply reservoir 10. An upper block 23 of said pump body 20 is provided with a discharge hole 21 and a flange 23a to which is secured an air chamber 30. The side wall opposite to the side to which the supply pipe 12 is connected is provided with what is generally referred to as a waste hole 22. The upper portion of said discharge hole 21 is inclined outwardly from the center to form a funnel-shaped seat in said upper block 23 wherein is disposed a valve piston 31 in the general configuration of an inverted truncated cone and which is mounted on a valve stem 32 extending through the upper block 23 in a central position relative to said hole 21. The end of the valve stem 32 extending beyond the valve piston 31 is threaded and has locked thereon by means of a nut 32a a plurality of weights 33 intended to increase the weight of the valve piston 31 which is made of lighter but more resilient material. The end of the piston stem 32 extending beneath the upper block 23 has disposed therearound a coil spring 34 locked thereto by means of a nut 32b to insure that there is a good seal between the valve piston 31 and the discharge hole 21.

The pressure tank 30 consists of an air chamber 301 and an outlet pipe 36. Said outlet pipe 36 is provided with a flat valve 35 to prevent any reverse flow of water so that water from the pump body 20 may be transferred to higher ground.

The general mode of operation of a pump of this type is as follows.

When a waste valve, to be described in detail below and comprised of a waste hole 22 and valve plate 40 in the drawings, is depressed for several seconds water will flow from the pump body 20. Water in the supply pipe flows into the pump body 20, raising the pressure therein. When the waste valve is suddenly closed by releasing pressure therefrom, the water has high deceleration and a large force is set up. At this time, the pressure will cause the valve 31 to open and water will flow from the pump body 20 to the pressure tank 30 by means of the discharge hole 21, from where it will be passed to the outlet pipe 36 by means of pressure in the air chamber 301. As water is discharged from the pump body 20 to the pressure tank 30, the pressure in the pump body 20 will be greatly decreased, causing valve 31 to close and the waste valve to open. Once the waste valve opens, water will again begin to accelerate down the supply pipe 12 until built up pressure in the pump body 20 causes the waste valve to close, forcing water to be discharged to the pressure tank 30. Once this cycle has begun, water may be pumped effortlessly for an infinite period of time, provided there is a water supply. Forcing the waste valve to remain closed for several seconds breaks the cycle, the water hammer stops, and the pump ceases to operate.

According to basic water hammer theory, if the clearance of the discharge valve of a water hammer pump is decreased the number of operations of that valve will be increased proportionately, increasing the efficiency of the pump. However, until now there has been no concrete design for the construction of such a valve that has been considered to be a superior design for achieving this end, or whereby it has been possible to control the number of operations the valve performs for a specified period of time. By controlling the total weight of the weights 33 and the amount of tension of the spring 34, this purpose may be achieved, raising the overall efficiency of the pump.

The waste hole 22 is provided in the wall 24 of the pump body 20 which is at an acute angle of approximately 45° to a level base 25. The bottom edge of a valve plate 40 is pivotally attached to the bottom edge of the waste hole 22 so that the upper portion may move freely up and down along an arched path of travel. The valve plate 40 is somewhat smaller than the waste hole 22 so the entire plate may fully enter therein. Applied onto the outside of the wall 24 is a resilient water proof gasket 43 having a hole significantly smaller than the valve plate 40 provided through the center thereof, a pressure plate 44 of size and shape corresponding to that of the gasket 43, and a waste valve housing 48 securely provided over the outside of wall 24, the gasket 43, and the pressure plate 44. By making the center hole in the pressure plate 44 and gasket 43 the same size and by virtue of the fact that they are significantly smaller than the waste hole 22, the waste hole 22 will be sealed very tightly when the valve plate 40 enters said waste hole 22 and comes flush with said gasket 43. In conventional water hammer pumps employing pivoted valve plates such as valve plate 40, said pivoted valve plates close directly onto a metallic or otherwise non-resilient pressure plate. Not only does this produce much noise, but it decreases the efficiency of the pump, as upon striking the pressure plate the valve plate will bounce back before a good seal has been obtained, causing the output to be delivered in large spurts rather than a continual flow. There is a direct relationship between the quality and the duration of the seal and the total efficiency of the pump, ie. the less time the waste valve is open, the higher the efficiency of the pump. According to the present invention, when the valve plate 40 strikes against the pressure plate 44, the gasket 43 will act as a buffer, absorbing the impact, and allowing a tight seal to be attained. Due to the impact absorbing function of the resilient gasket 43, the seal will be maintained until pressure in the pump body 20 has been significantly decreased by water escaping said body 20 into the air chamber 30 by means of the discharge hole 21. Therefore, as the time wherein the waste hole 22 is open is greatly decreased, the efficiency will be much higher, and the output flow will be relatively stable and constant, with no noticeable intervals or spurts. Of course, much noise will also be eliminated, not to mention the strain to the pump caused by impact shock.

Through the center portion of valve plate 40 is provided a valve stem 41, and at the bottom of the valve plate are provided adjustment bolts 42. By adjusting the length of the valve stem 41 the amount of movement of the valve plate 40 inside the pump body 20 and the angle of the opening between the waste valve hole 22 and valve plate 40 may be controlled. The waste valve housing 48 is provided with a control rod 46 having one end exposed and extending out of the housing 48. The exposed end of control rod 46 is provided with a knob 460 and a spring 47 is disposed between said knob 460 and the waste valve housing 48. The opposite end of the control rod 46 extends through a throat base 45 provided internally of the waste valve housing 48 and contacts the waste valve stem 41. The adjustment bolts 42 serve to control the tightness of the valve plate 40 to the inner wall of the pump body 20. The looser the valve plate 40 is adjusted the more utilization of the full force of the water hammer may be attained. However, if the valve plate 40 is too loose, there is a higher possibility of damage. By adjusting the bolts 42 it is possible to obtain the best advantage of the force of the water hammer possible without damaging the pump.

As shown in FIG. 2, one end of a water return pipe 51 is attached to the lower end of the waste valve housing 48. An outlet gate valve 510 is provided at a tee to said pipe 51 and past said gate valve 510 is provided a globe valve 511. The other end of pipe 51 is connected to a return tank 50. Said return tank 50 is provided internally with a horizontal rib 52 over which is hooked or otherwise secured a tension spring 53. The spring 53 hangs down to the open end of the return tank 50, which ends in a nozzle 54. A steep sided tray 55 having a diameter substantially larger than that of the open nozzle 54 is hooked or otherwise secured to the free end of the spring 53. A dome-like stopper 56 of a resilient material is provided on the floor of the tray 55 capable of sealing shut the mouth of the nozzle 54. An elevated base 13 having a diameter less than the main body of the tank 50 but greater than that of the nozzle 54 is provided on the supply pipe 12 relatively close to the pump body 20 and the return tank 50 is mounted therein.

To start the operation of this pump, the valve 510 is opened and the control rod 46 is depressed causing the waste hole 22 to be opened. Water will then flow from a supply reservoir 10 or any suitable water supply through a filter screen 11 secured to one end of the supply pipe 12 and into the pump body 20, forcing the valve plate 40 to close and thereby initiating water hammer force to drive the pump as previously explained. Each time the waste hole 22 is opened, water will flow therefrom and into the return pipe 51. Any trapped air in the waste valve housing 48 will be released through the open valve 510. When all such air has been expelled, the gate valve 510 is closed and the water from the waste valve will flow past the one way globe valve 511 to the return tank 50. The mouth of the nozzle 54 is generally sealed shut as the tension of the spring 53 pulls the dome shaped stopper 56 thereagainst, preventing water from the supply pipe 12 from entering the return tank 50. However, as the valve plate 40 is closed, much water will be thrust out thereby into the waste valve housing 48 and consequently into the return pipe 51 and return tank 50. The increased pressure produced by this thrusting action will force the tray 55 and stopper 56 away from the mouth of the nozzle 54 and water will flow back into the supply pipe 12. This is possible as at this point during the water hammer cycle the water in the supply pipe 12 has decelerated and due to secondary pressure waves from the pump body 20 is on the verge of flowing back towards the reservoir 10. Because of this, the water in the supply pipe 12 is under very low pressure and will not enter the base 13. The sudden reduction of pressure in the supply pipe 12 and base 13 will also help to release the stopper 56 from the nozzle 54. As the thrust pressure in the return line is relieved, the spring 53 will cause the stopper 56 to return to a sealing relationship with the nozzle 54, just as the water in the supply pipe 12 begins to accelerate towards the pump body 20 under increasingly high pressure to continue the water hammer cycle. By returning the waste water to the pump in this intermittent fashion at times of low pressure in the supply pipe 12, it is possible to return all of the water from the waste hole 22 to the pump body 20.

To cease operation of the pump, only the globe valve 511 need be closed. As water is prevented from passing through the return pipe 51 pressure will be stabilized in the pump body 20. Under stable pressure the valve plate 40 will cease to open and close and water hammer will disappear. By opening said valve 511, the pump will resume operation.

Figure 5:
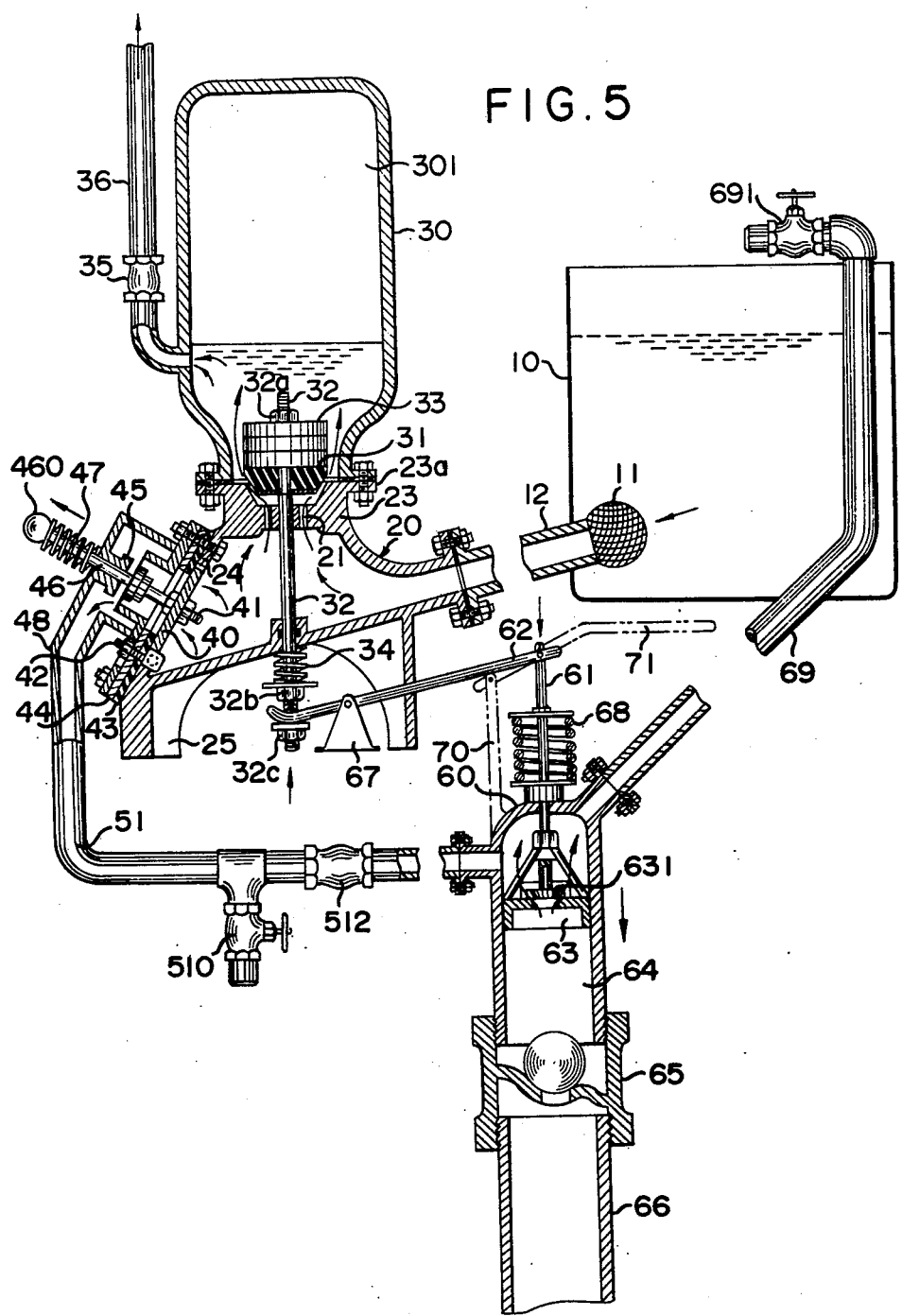
FIG. 5 is a similar view showing the mode of operation thereof.

In another embodiment of the present invention, the up and down movement of the discharge valve 31 and stem 32 is utilized to drive a second pump to draw water from an underground source and, if desired, supply such water to the supply reservoir 10 of the water hammer pump, as shown in FIGS. 4 and 5.

According to this embodiment, the return pipe 12 is provided with a check valve 512 and said return pipe 51 is connected to the upper chamber of a water drawing pump 60. Said water drawing pump 60 is provided with a piston 63 in the middle of which is provided a check valve piston 631. Said piston 63 is connected to a piston rod 61 which extends through the top portion of the water drawing pump 60, the extending end thereof having disposed thereon a compression spring 68 for the purpose of aiding the operation of the piston rod 61 and above said discharge valve rod 32, making the operation more sensitive and accurate. At the top of the piston rod 61 there is pivotally secured a lever 62, which is pivotally secured to a support base 67 at a section near the end opposite the end secured to the piston rod 61, said opposite end being pivotally secured to the discharge valve rod 32 by any suitable means. As shown in FIGS. 4 and 5, the discharge valve rod 32 extends beyond the bottom of the pump body 20 and the spring 34 is disposed between the lever 62 and the bottom of the pump body 20.

The lower end of the said upper chamber 64 of the water drawing pump 60 adjoins a check globe valve 65, the lower end of which is connected to a suction pipe 66 leading to an underground water source. In addition, the upper portion of the water drawing pipe 60 is provided with an outlet pipe 69 which leads to the supply reservoir 10 for the water hammer pump and is provided at that end with a control valve 691. A hand lever 71 may be attached to the upper end of the piston rod 61 and secured to the top of the water drawing pump 60 by means of a connecting rod 70 (shown in broken lines in FIGS. 4 and 5) so that the water drawing pump may be operated manually to fill the supply reservoir 10 should there be an insufficient water supply to facilitate operation of the water hammer pump. The lever 62 may be first detached from the piston rod 61 to insure easier manual operation.

After attaching the lever 62 to the piston rod 61, and when the water hammer pump has been started as above explained, the steady rhythmic up and down movement of the discharge valve stem 32 will, by means of lever 62, drive the piston rod 61 to operate the water drawing pump to draw water from an underground source.

The operation of this embodiment of the present invention is identical in all respects except that to cease operation, the valve 691 is closed which performs the same function as valve 511 in the previous embodiment.

In this way, a high efficiency water hammer pump may be provided which eliminates shock, noise, and wasted water so that it may be used commercially to supply houses, schools and offices with water day and night, with no need for electricity or other power sources.

I claim:

1. An improved construction of a water hammer type pump comprising a base, a pump body, means for supplying water to said pump body, a pressure tank secured to said pump body, said pressure tank having a water outlet, a discharge valve disposed between the pressure tank and the pump body for allowing water from the pump body to enter the pressure tank, a waste water outlet including a hole and a flat plate pivotally secured to an inside wall of the pump body so that upon back and forth movement the plate will open and close said hole alternately allowing water to escape from the pump body and preventing such escape for the purpose of initiating water hammer force to force water from the pump body to the pressure tank by way of the discharge valve provided therebetween, the improvement wherein the discharge valve comprises an assembly including a valve stem, a resilient valve piston shaped as an inverted truncated cone disposed on said stem, a plurality of adjustable weights removably mounted on the valve piston for controlling the operation of said piston, and a spring disposed around said valve stem and biassing the same to urge the weights against the piston to aid in the accuracy and sensitivity of the operation, said assembly being disposed in a hole in said pump body generally corresponding to the shape of the valve piston and including means for slidably supporting the valve stem in said hole in said pump body.

2. A construction for a water hammer type pump as claimed in claim 1 wherein said flat plate of the waste outlet is slightly smaller than said hole of said waste outlet, said outlet also including a resilient gasket having a hole substantially smaller than the flat plate, said gasket being mounted on an outside wall of the pump body and over the hole of said waste outlet, a second plate of substantially the same dimensions as the gasket, said second plate being secured on the pump body on the side of the gasket not in contact with the pump body so that when the flat plate enters the hole of said waste outlet its face will be flush against said gasket creating a firm seal to prevent water in the pump stock from escaping therethrough; and a plurality of adjustable bolts connecting said flat plate to said pump body to control the tightness of the flat plate against the wall of the pump body on which said flat plate is mounted.

3. A construction of a water hammer type pump as in claim 2 wherein said flat plate has provided the center portion thereof a threaded bolt which may be adjusted to control the freedom of movement of said flat plate in the pump body.

4. A construction for a water hammer type pump as claimed in claim 2 comprising means over said waste water outlet to return water released therefrom to the supply means of the pump body including a housing secured over said waste water outlet, a pipe connected at one end to said housing and at the other end to a return means, said return means including a tank on the supply means and having a neck substantially smaller in diameter than the main body thereof, said neck being provided with an opening and a spring-mounted stopper means for sealing and opening, whereby water travelling under high pressure from the waste water outlet to the tank by means of said pipe may force the stopper to disengage the opening momentarily and flow into said supply means, whereafter said spring-mounted stopper will re-engage said opening.

5. A construction of a water hammer type pump as claimed in claim 2, wherein said valve stem extends through the bottom of the pump body and has attached thereto one end of a lever, the other end of which is connected to a piston rod to drive a second pump to draw water from an underground source, a housing being provided over said waste water outlet and a pipe being connected between said housing and said second pump so that water released from said waste water outlet will flow to said second pump serving to prime said second pump, and after said second pump has been primed and has begun to draw water from an underground source, water from said waste water outlet will be transferred by said second pump with the water drawn from the underground source.

6. A construction for a water hammer type pump as claimed in claim 1 further comprising means connected to said waste water outlet for returning water discharged therefrom to the supply means of said pump body.

7. A construction for a water hammer type pump as claimed in claim 6 comprising means for supplying underground to the waste water return means for flow to the supply means of said pump body.

* * * * *